(12) United States Patent
Pifher et al.

(10) Patent No.: US 11,085,382 B2
(45) Date of Patent: Aug. 10, 2021

(54) EVAPORATIVE EMISSION CONTROL SYSTEM AND METHOD

(71) Applicant: Ford Global Technologies, LLC, Dearborn, MI (US)

(72) Inventors: Kenneth Pifher, Holly, MI (US); Dennis Yang, Canton, MI (US); Mark Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 529 days.

(21) Appl. No.: 15/910,977

(22) Filed: Mar. 2, 2018

(65) Prior Publication Data

US 2019/0271275 A1 Sep. 5, 2019

(51) Int. Cl.
| | | |
|---|---|---|
| *F02D 41/02* | (2006.01) | |
| *F02D 41/00* | (2006.01) | |
| *B60W 20/40* | (2016.01) | |
| *B60W 10/08* | (2006.01) | |
| *B60W 10/06* | (2006.01) | |
| *B60K 15/03* | (2006.01) | |
| *B60K 15/01* | (2006.01) | |
| *F02N 11/08* | (2006.01) | |

(52) U.S. Cl.
CPC ............ *F02D 41/021* (2013.01); *B60K 15/01* (2013.01); *B60K 15/03* (2013.01); *B60W 10/06* (2013.01); *B60W 10/08* (2013.01); *B60W 20/40* (2013.01); *F02D 41/0032* (2013.01); *F02D 41/0035* (2013.01); *F02N 11/0829* (2013.01); *B60K 2015/0321* (2013.01); *B60W 2710/06* (2013.01); *B60W 2710/08* (2013.01); *B60Y 2200/92* (2013.01); *Y10S 903/902* (2013.01)

(58) Field of Classification Search
CPC ............... F02D 41/021; F02D 41/0035; F02D 41/0032; F02D 41/062; F02N 11/0829; B60W 20/40; B60W 10/08; B60W 10/06; B60W 2710/06; B60W 2710/08; B60K 15/03; B60K 15/01; B60K 2015/0321; B60K 6/48; Y10S 903/902; B60Y 2200/92; Y02T 10/40; Y02T 10/62; F02M 25/08

See application file for complete search history.

(56) References Cited

U.S. PATENT DOCUMENTS

| | | | | |
|---|---|---|---|---|
| 6,016,460 A | * | 1/2000 | Olin ..................... | F02D 41/0072 701/102 |
| 6,079,397 A | * | 6/2000 | Matsumoto ......... | F02D 41/0045 123/698 |
| 6,378,505 B1 | * | 4/2002 | Doering ............. | F02M 25/0809 123/198 D |
| 6,557,534 B2 | | 5/2003 | Robichaux et al. | |
| 6,679,214 B2 | * | 1/2004 | Kobayashi ............. | B60L 58/20 123/179.4 |
| 9,322,348 B2 | | 4/2016 | Yang et al. | |
| 9,328,678 B2 | * | 5/2016 | Bohr ................... | F02D 41/0037 |

(Continued)

*Primary Examiner* — Rami Khatib
(74) *Attorney, Agent, or Firm* — Geoffrey Brumbaugh; McCoy Russell LLP

(57) ABSTRACT

A method for operating a vehicle with an internal combustion engine is provided that includes regulating a pressure in a fuel tank by scheduling an engine start-up event based on a rate of change of the fuel tank pressure to reduce fuel tank venting emissions, where the rate of change of the fuel tank pressure is determined based on an ambient temperature and an in-tank pressure.

18 Claims, 6 Drawing Sheets

(56) References Cited

U.S. PATENT DOCUMENTS

| | | | |
|---|---|---|---|
| 9,482,191 | B2 | 11/2016 | Yang et al. |
| 9,739,423 | B2 | 8/2017 | Antonelli |
| 2002/0079149 | A1* | 6/2002 | Kotre .................... B60K 6/445 180/65.235 |
| 2002/0083930 | A1* | 7/2002 | Robichaux ............ F02D 11/105 123/520 |
| 2002/0096137 | A1* | 7/2002 | Kobayashi .............. B60L 50/16 123/179.4 |
| 2004/0226543 | A1* | 11/2004 | Penschuck ............. F02M 25/08 123/518 |
| 2006/0053868 | A1* | 3/2006 | Chung .................. B60W 20/00 73/49.7 |
| 2009/0070001 | A1* | 3/2009 | Takakura ............ F02N 11/0829 701/102 |
| 2010/0132676 | A1* | 6/2010 | Kitamura ........... F02M 25/0836 123/520 |
| 2010/0307464 | A1* | 12/2010 | Schondorf .......... F02N 11/0829 123/520 |
| 2012/0095631 | A1* | 4/2012 | Rauner ................ B60W 20/15 701/22 |
| 2013/0152905 | A1* | 6/2013 | Woods ................ G01N 29/024 123/520 |
| 2014/0052361 | A1* | 2/2014 | Blumenstock ........ F02D 41/021 701/102 |
| 2015/0006059 | A1* | 1/2015 | Castleberry ........ F02M 25/0222 701/102 |
| 2015/0075251 | A1 | 3/2015 | Jentz et al. |
| 2015/0075267 | A1 | 3/2015 | Sweppy et al. |
| 2018/0093658 | A1* | 4/2018 | Rauner ............... F02D 41/0032 |
| 2019/0353112 | A1* | 11/2019 | Kim ................... F02D 41/0042 |

* cited by examiner

EVAPORATIVE EMISSION CONTROL SYSTEM AND METHOD

FIELD

This disclosure relates to a vehicle having an evaporative emission control system and a method for operation of said vehicle and system.

BACKGROUND/SUMMARY

Vehicles have utilized sealed fuel tanks in fuel delivery systems to reduce evaporative emissions. However, sealed fuel tanks build up excessive pressure during diurnal operation. Hybrid vehicles exacerbate such problems because the engine and fuel delivery system remain unused for greater periods than non-hybrid vehicles. Moreover, trends in hybrid electric vehicle design aimed at decreasing vehicle fuel use have led to additional decreases in engine run time, further worsening the problem of fuel tank pressure build-up. In previous evaporative emission control systems, routine venting of the vapor canister and fuel tank occurs during engine operation. However, when the engine remains unused for extended durations the pressure in the fuel tank may reach undesirable levels. Additionally, certain emission requirements necessitate that fuel vapor is only captured by the carbon canister during refueling. Evaporative emission control systems that only allow carbon capture during refueling are commonly referred to as non-integrated refueling canister only systems (NIRCOS). Thus, the carbon canister cannot be loaded at other times in these systems, resulting in fuel tank pressure build-up. The pressure build-up may lead to an in-tank over pressure condition necessitating venting of fuel vapor to the carbon canister which is not desired in NIRCOS. In other evaporative emission control systems when the fuel tank reaches the blow-off limit fuel vapor may be vented directly to the surrounding environment.

U.S. Pat. No. 6,557,534 discloses a hybrid vehicle with a vapor control system that purges a carbon canister when a fuel tank pressure or a time since the last purge cycle has surpassed a threshold value. The inventors have recognized several drawbacks with the vehicle disclose in U.S. Pat. No. 6,557,534. For instance, U.S. Pat. No. 6,557,534 does not take into account ambient temperature effects on the in-tank pressure or make any predictive calculations. Consequently, the in-tank pressure may unexpectedly rise above a blow-off pressure leading to increased evaporative emissions. Furthermore, the vapor control system in U.S. Pat. No. 6,557,534 cannot isolate the carbon canister from the fuel tank. Consequently, the vapor control system cannot adhere to certain emissions standards that require the carbon canister to be loaded only during refueling. Therefore, the engine in U.S. Pat. No. 6,557,534 may not be capable of meeting certain emission requirements, thereby limiting the number of markets where the vehicle can be sold.

To overcome at least some of the aforementioned problems the inventors have developed a method for operating a vehicle with an internal combustion engine that includes regulating a pressure in a fuel tank by scheduling an engine start-up event based on a rate of change of the fuel tank pressure to reduce fuel tank venting emissions, where the rate of change of the fuel tank pressure is determined based on an ambient temperature and an in-tank pressure. In this way, the rate of change of tank pressure can be extrapolated to predict if the tank pressure is expected to surpass a pressure that triggers fuel tank venting and responsive to such a prediction mitigating actions can be taken to reduce fuel tank pressure. Consequently, the likelihood of fuel tank degradation caused by an overpressure condition can be reduced while also reducing vapor canister loading. Resultantly, evaporative emissions may be reduced, thereby decreasing the engine's environmental impact.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
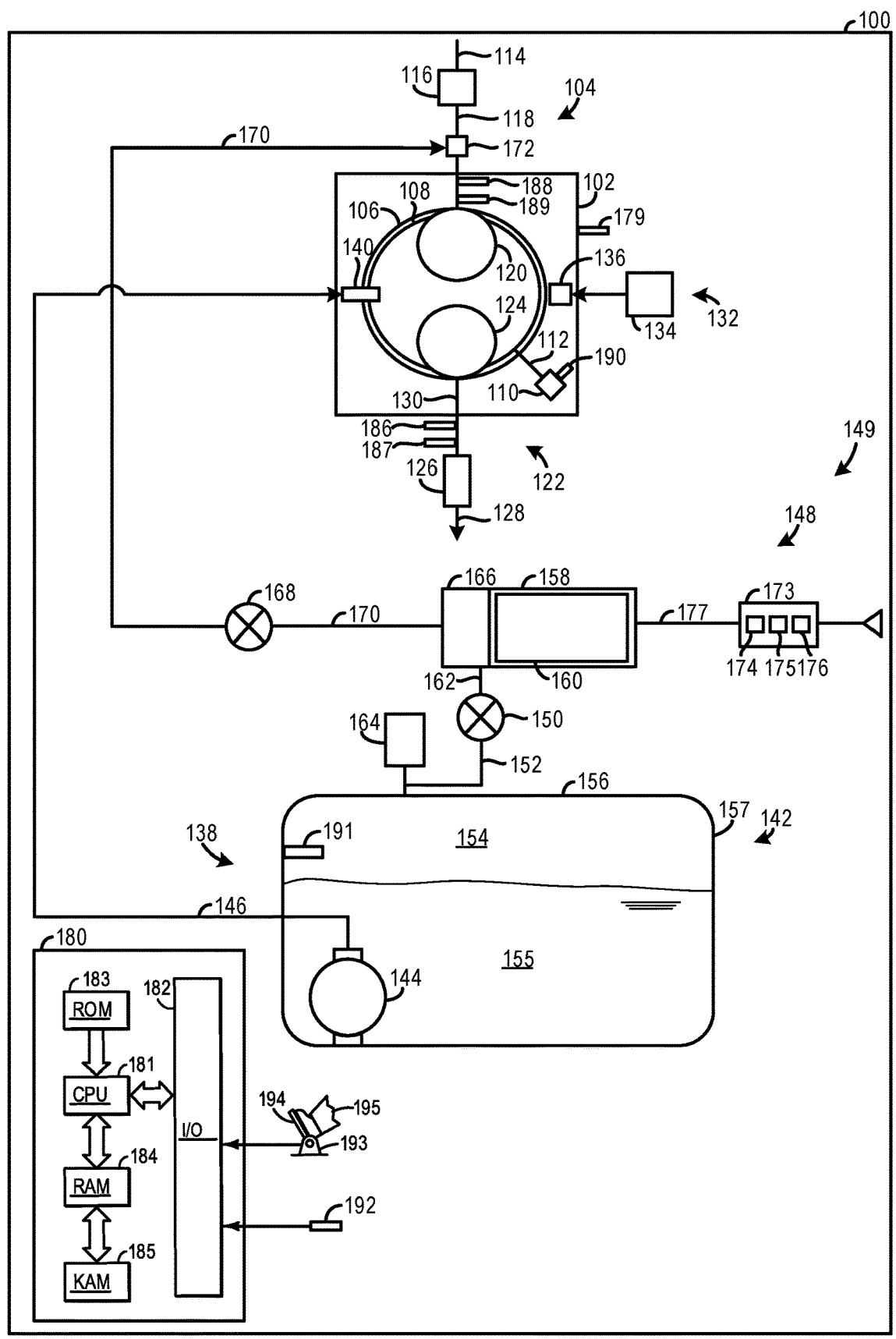
FIG. 1 shows a schematic depiction of a vehicle having an internal combustion engine.
Figure 2:
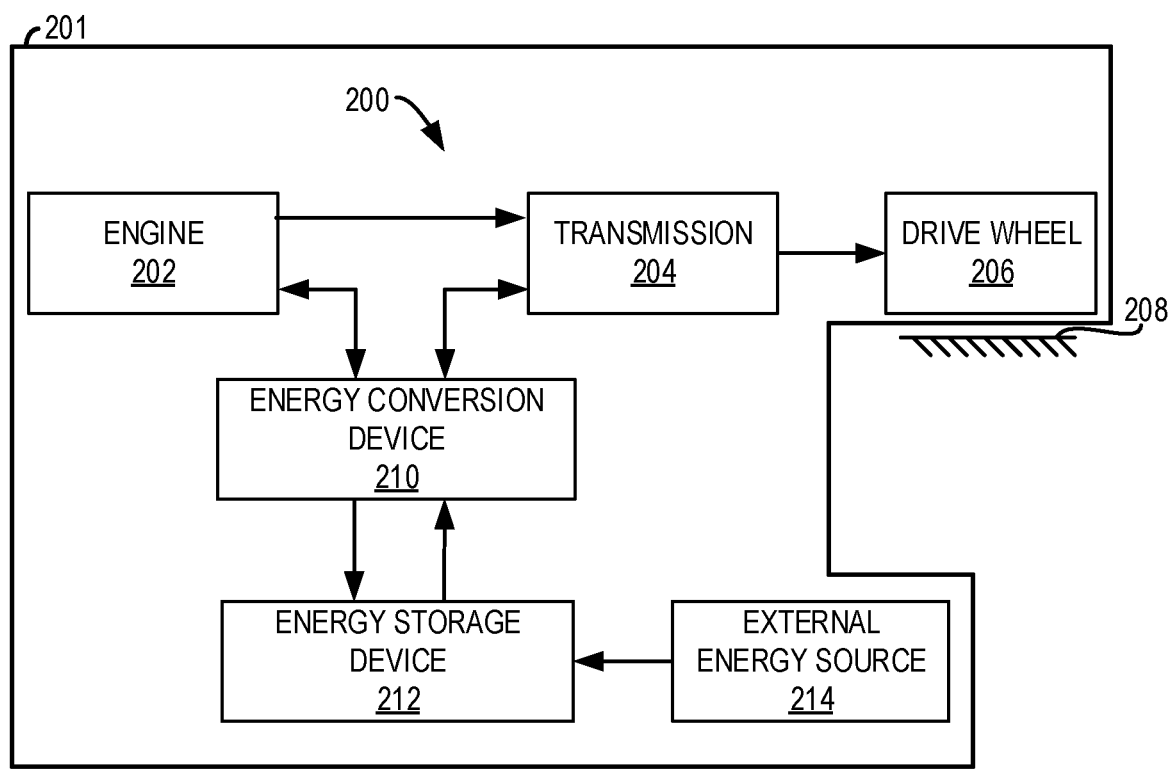
FIG. 2 shows an example of a hybrid vehicle.
Figure 3:
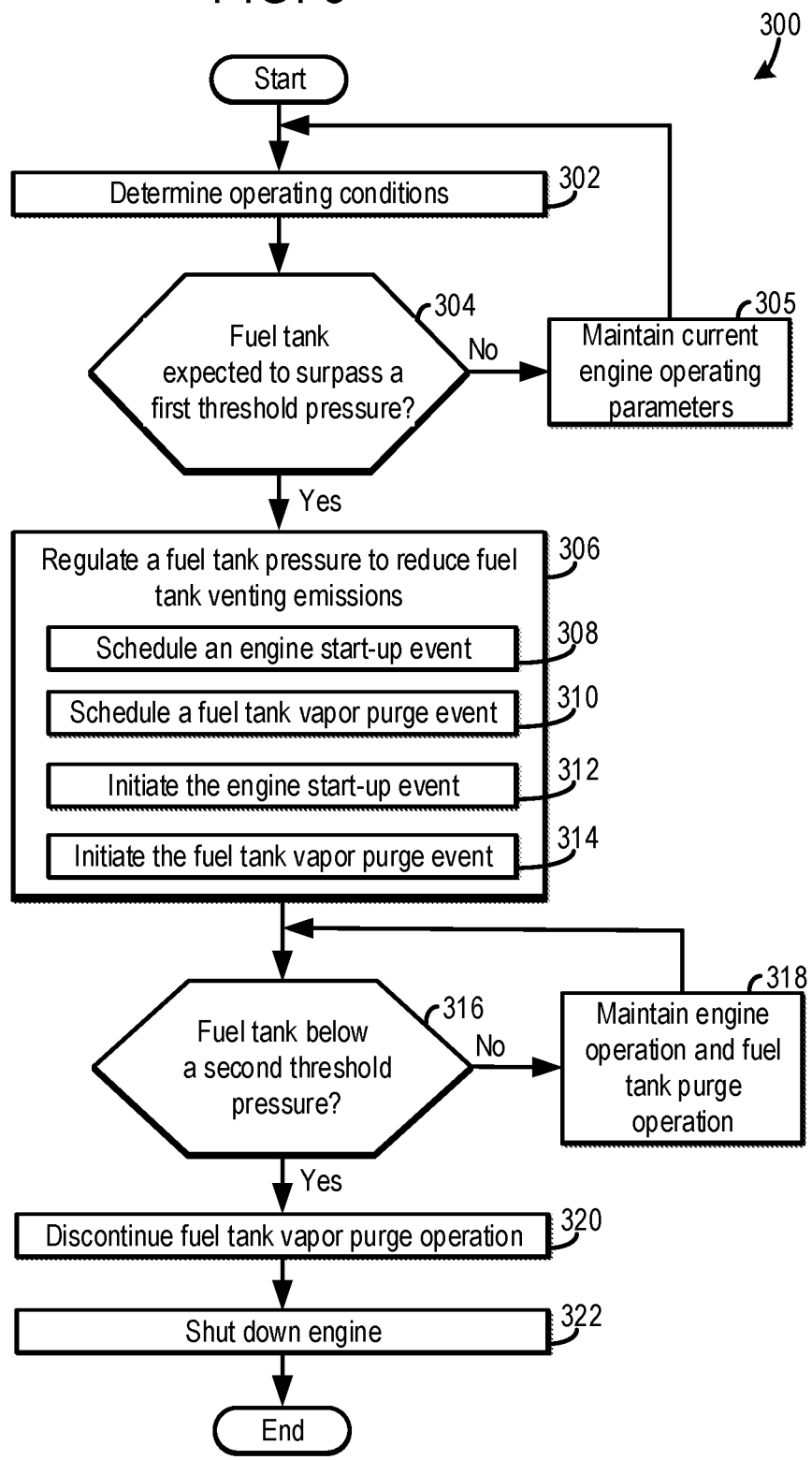
FIG. 3 shows a method for regulating pressure in a fuel tank by scheduling an engine start event.
Figure 4:
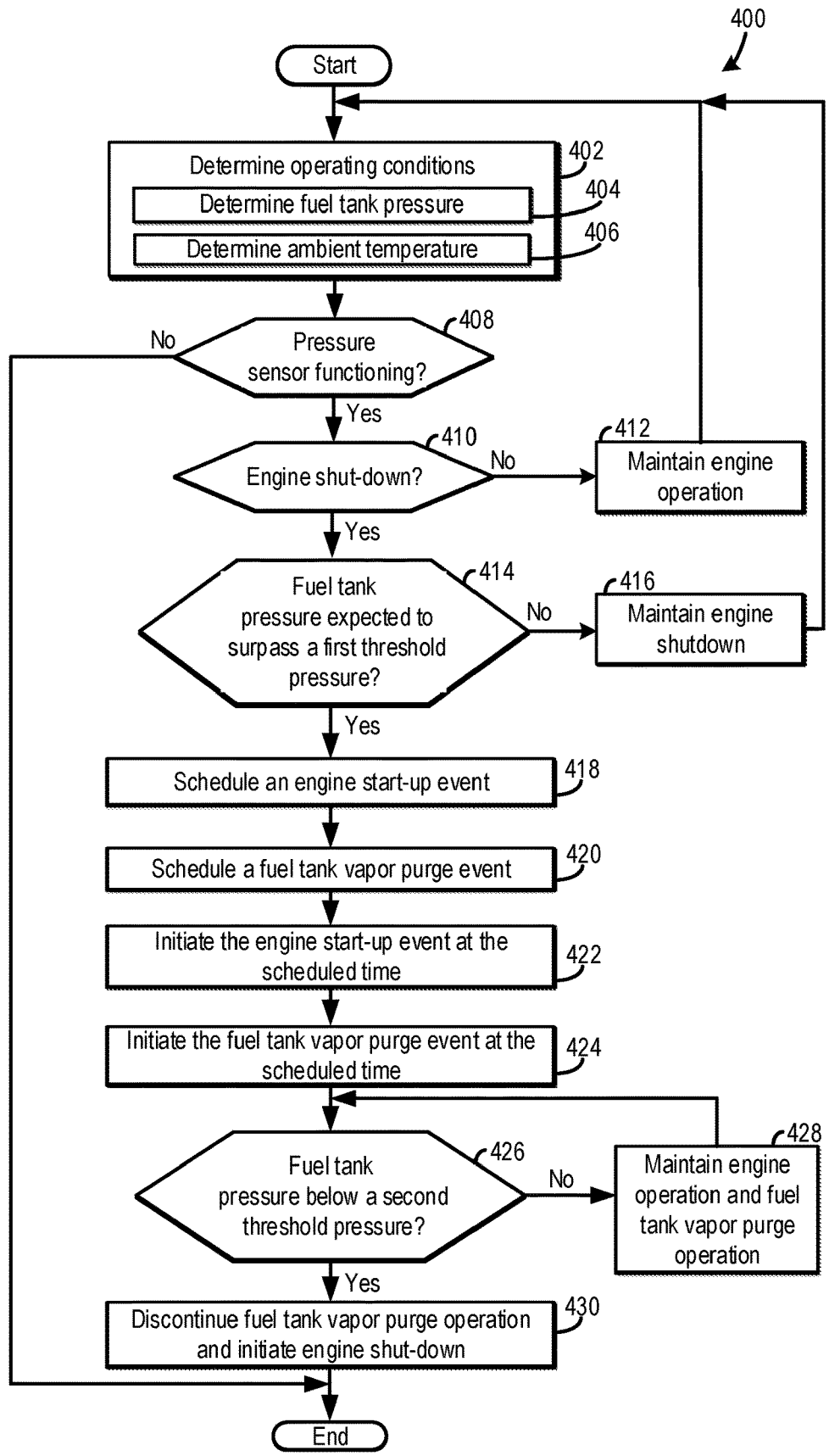
FIG. 4 shows another method for regulating pressure in a fuel tank of a hybrid vehicle by scheduling an engine start event.
Figure 5:
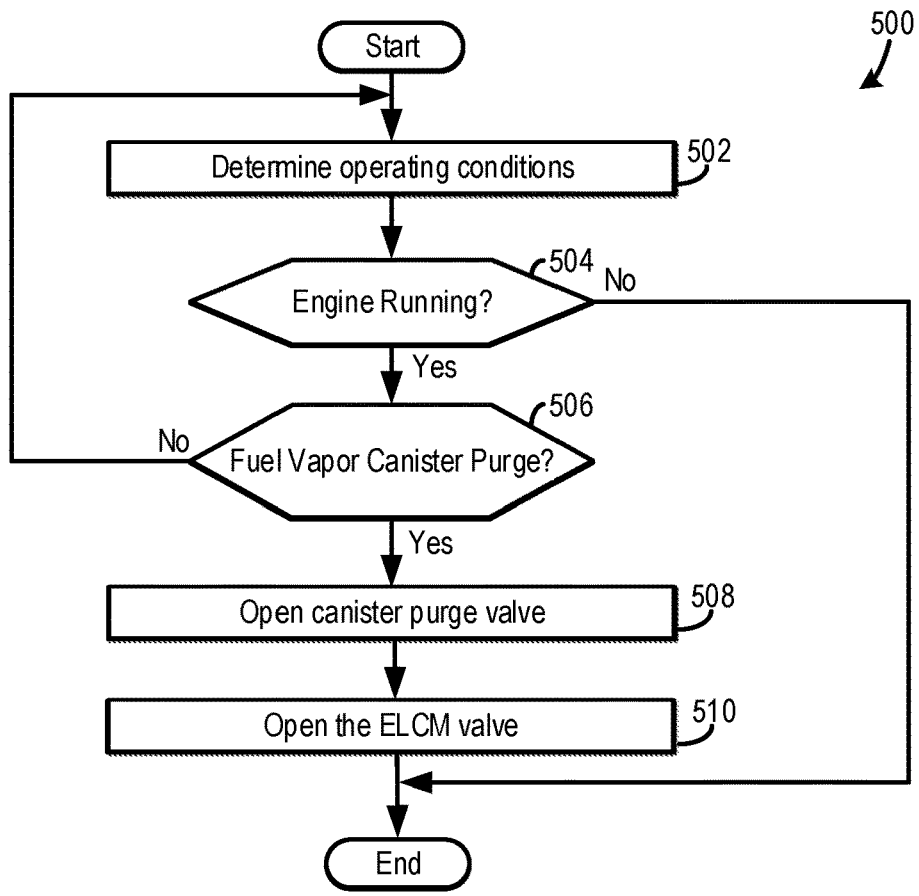
FIG. 5 shows a method for purging a fuel vapor canister while the engine is running.
Figure 6:
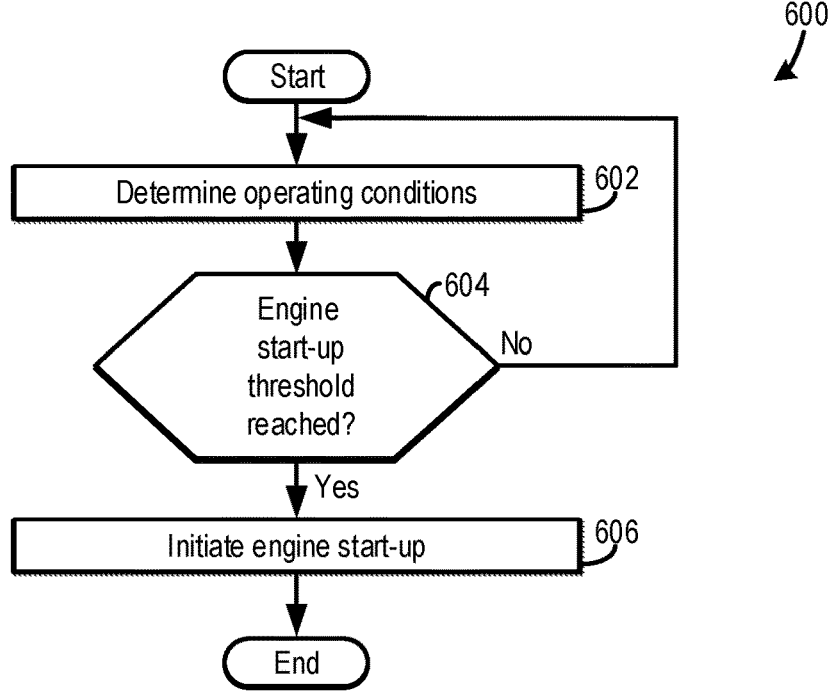
FIG. 6 shows a method for starting an engine.
Figure 7:
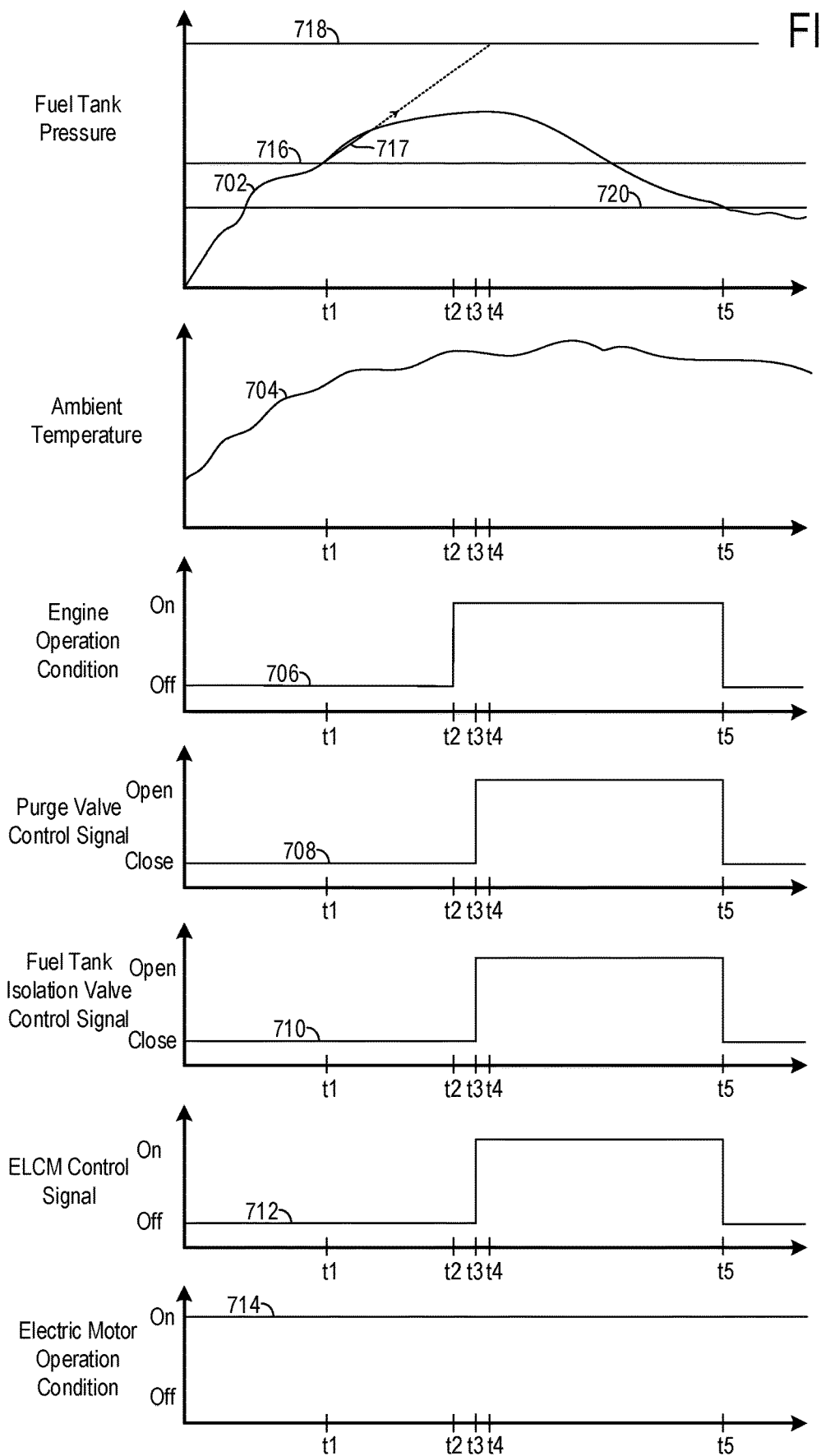
FIG. 7 shows graphs depicting a control strategy for regulating pressure in a fuel tank.

The present description relates to a vehicle with an evaporative emission control system and a method that predicts when an over-pressure condition that triggers fuel tank vapor venting will occur taking into account in-tank fuel pressure as well as ambient temperature effects on the in-tank pressure. When such a prediction is made an engine start-up and fuel vapor purge event are scheduled to reliably reduce the likelihood of a fuel tank over-pressure condition occurring. In this way, unwanted carbon canister loading can be avoided. Thus, the engine's evaporative emissions may in turn be reduced. Moreover, predicting when an overpressure condition will occur enables the system to efficiently schedule an engine start-up and a vapor purge event such that these events do not interfere with other operations in the vehicle, if desired. Regulating the fuel tank pressure as noted above also enables quicker tank depressurization time during hot weather conditions, if desired, and enables the fuel tank pressure to be maintained in a desirable range. In one example, the over-pressure prediction may be carried out using a rate of change of the pressure in the fuel tank that is calculated using an in-tank pressure as well as the ambient temperature effects on fuel tank pressure. Consequently, the confidence of the prediction may be increased, thereby reducing the likelihood of false predictions of fuel tank vapor venting. FIG. 1 shows a schematic depiction of a vehicle with an internal combustion engine having an evaporative emission control system. FIG. 2 shows an example of a hybrid electric vehicle. FIG. 3 shows a method for predicting when a fuel tank over-pressure condition will occur and taking preventative actions. FIG. 4 shows a more detailed method for predicting if a fuel tank overpressure condition is going to occur and taking preventative actions to reduce the likelihood of the overpressure condition occurring. FIG. 5 shows a method for purging a fuel vapor canister. FIG. 6 shows a method for starting an engine when a start-up threshold is reached. FIG. 7 shows graphs depicting an example of a strategy for predicting when a fuel tank over-pressure condition will occur and taking preventative actions to reduce the likelihood of the overpressure condition occurring.

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1.

An intake system 104 providing intake air to a cylinder 106, is also depicted in FIG. 1. It will be appreciated that the cylinder may be referred to as a combustion chamber. A piston 108 is positioned in the cylinder 106. The piston 108 is coupled to a crankshaft 110 via a piston rod 112 and/or other suitable mechanical component. It will be appreciated that the crankshaft 110 may be coupled to a transmission which provides motive power to a drive wheel. Although, FIG. 1 depicts the engine 102 with one cylinder. The engine 102 may have additional cylinders, in other examples. For instance, the engine 102 may include a plurality of cylinders that may be positioned in banks.

The intake system 104 includes an intake conduit 114 and a throttle 116 coupled to the intake conduit. The throttle 116 is configured to regulate the amount of airflow provided to the cylinder 106. For instance, the throttle 116 may include a rotatable plate varying the flowrate of intake air passing therethrough. In the depicted example, the throttle 116 feeds air to an intake conduit 118 (e.g., intake manifold). In turn, the intake conduit 118 directs air to an intake valve 120. The intake valve 120 opens and closes to allow intake airflow into the cylinder 106 at desired times. Further, in other examples, such as in a multi-cylinder engine additional intake runners may branch off of the intake conduit 118 and feed intake air to other intake valves. It will be appreciated that the intake conduit 118 and the intake valve 120 are included in the intake system 104. Moreover, the engine shown in FIG. 1 includes one intake valve and one exhaust valve. However, in other examples the cylinder 106 may include two or more intake and/or exhaust valves.

An exhaust system 122 configured to manage exhaust gas from the cylinder 106 is also included in the vehicle 100, depicted in FIG. 1. The exhaust system 122 includes an exhaust valve 124 designed to open and close to allow and inhibit exhaust gas flow to downstream components from the cylinder. For instance, the exhaust valve may include a poppet valve with a stem and a valve head seating and sealing on a cylinder inlet in a closed position.

The exhaust system 122 also includes an emission control device 126 coupled to an exhaust conduit 128 downstream of another exhaust conduit 130 (e.g., exhaust manifold). The emission control device 126 may include filters, catalysts, absorbers, combinations thereof, etc., for reducing tailpipe emissions. The engine 102 also includes an ignition system 132 (e.g., spark plug) including an energy storage device 134 designed to provide energy to an ignition device 136. Additionally or alternatively, the engine 102 may perform compression ignition.

A fuel delivery system 138 is also shown in FIG. 1. The fuel delivery system 138 provides pressurized fuel to a fuel injector 140. In the illustrated example, the fuel injector 140 is a direct fuel injector coupled to cylinder 106. Additionally or alternatively, the fuel delivery system 138 may also include a port fuel injector designed to inject fuel upstream of the cylinder 106 into the intake system 104. For instance, the port fuel injector may be an injector with a nozzle spraying fuel into an intake port at desired times. The fuel delivery system 138 includes a fuel tank 142 and a fuel pump 144 designed flow pressurized fuel to downstream components. For instance, the fuel pump 144 may be an electric pump with a piston and an inlet in the fuel tank that draws fuel into the pump and delivers pressurized fuel to downstream components. However, other suitable fuel pump configurations have been contemplated. Furthermore, the fuel pump 144 is shown positioned within the fuel tank 142. Additionally or alternatively the fuel delivery system may include a second fuel pump (e.g., higher pressure fuel pump) positioned external to the fuel tank. A fuel line 146 provides fluidic communication between the fuel pump 144 and the fuel injector 140. The fuel delivery system 138 may include additional components such as a higher pressure pump, valves (e.g., check valves), return lines, etc., to enable the fuel delivery system to inject fuel at desired pressures and time intervals.

During engine operation, the cylinder 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

The vehicle 100 also includes an evaporative emission control system 148. The evaporative emission control system 148 may be included in a vehicle system 149 that also includes the fuel delivery system 138, in some instances. The evaporative emission control system 148 may include the fuel tank 142 and a fuel tank isolation valve 150 coupled to a vapor line 152 extending into the fuel tank 142. Specifically, the vapor line 152 extends into the fuel tank 142 in a region 154 above liquid fuel 155 (e.g., gasoline, diesel, alcohol, combinations thereof, etc.,) stored therein where fuel vapors may reside. Thus, the vapor line 152 may extend through a top wall 156 or an upper section of a sidewall 157 of the fuel tank, in some instances. The fuel tank isolation valve 150 is designed to open and close to allow and inhibit fuel vapor flow therethrough. For instance, the fuel tank isolation valve 150 may be an electromagnetic valve with mechanical components for flow adjustment. However, other suitable fuel tank isolation valve types have been contemplated.

The evaporative emission control system 148 further includes a fuel vapor canister 158 designed to store fuel vapor. The fuel vapor canister 158 may include carbon sections 160 (e.g., activated carbon sections) that capture fuel vapor. The fuel vapor canister 158 receives fuel vapor from the fuel tank isolation valve 150 via a vapor line 162 when the valve is in an open position. A pressure sensor 164 is shown coupled to the vapor line 152. Thus, the pressure sensor 164 may be configured to monitor the pressure in the fuel tank 142. For instance, the pressure sensor 164 may be a pressure transducer, in one instance. A buffer canister 166 may also be included in the evaporative emission control system 148 between the fuel vapor canister 158 and the engine 102 and the fuel vapor canister. The buffer canister may act to reduce any large hydrocarbon or fuel vapor spikes going to the engine to prevent an over rich condition. Thus, the buffer canister may act to dampen any fuel vapor spikes flowing between the fuel tank and the engine.

A canister purge valve 168 is positioned in a vapor line 170 extending between the fuel vapor canister 158 and the intake system 104 and specifically the intake conduit 118 at a junction 172, in the illustrated example. However, in other examples the fuel vapor may be routed to other suitable locations in the intake system 104. At the junction 172 the vapor line 170 opens into the intake conduit 118.

The evaporative emission control system 148 may further include an evaporative leak check module (ELCM) 173. The ELCM 173 includes three components in the depicted example, a pump 174, an ELCM pressure sensor 175, and a valve 176 (e.g., changeover valve). The pump 174 may be vacuum pump and the pump and the valve 176 may operate in tandem during purge operation to flow air upstream through the fuel vapor canister 158 and eventually into the intake system 104. In other examples, the ELCM 173 may include only the valve 176 and the pump 174 or only the valve 176. The ELCM 173 may assist in flowing air into the fuel vapor canister 158 to flow fuel vapor through the vapor line 170 and into the intake system 104. The ELCM 173 is shown coupled to a line 177 coupled to the fuel vapor canister 158.

FIG. 1 also shows a controller 180 in the vehicle 100. Specifically, controller 180 is shown in FIG. 1 as a conventional microcomputer including: microprocessor unit 181, input/output ports 182, read-only memory 183, random access memory 184, keep alive memory 185, and a conventional data bus. Controller 180 is configured to receive various signals from sensors coupled to the engine 102. The sensors may include engine coolant temperature sensor 179, exhaust gas composition sensor 186, exhaust gas airflow sensor 187, an intake airflow sensor 188, manifold pressure sensor 189, engine speed sensor 190, a fuel tank pressure sensor 191, ambient temperature sensor 192, pressure sensor 164, etc. Additionally, the controller 180 is also configured to receive throttle position (TP) from a throttle position sensor 193 coupled to a pedal 194 actuated by an operator 195.

Additionally, the controller 180 may be configured to trigger one or more actuators and/or send commands to components. For instance, the controller 180 may trigger adjustment of the throttle 116, fuel injector 140, fuel tank isolation valve 150, ELCM 173, fuel pump 144, canister purge valve 168, etc. Specifically in one example, the controller 180 may send signals to an actuator in the fuel tank isolation valve 150 that opens and/or closes the valve to facilitate valve adjustment. Furthermore, the controller 180 may be configured to send control signals to actuators in the fuel pump 144 and the fuel injector 140 to control the amount and timing of fuel injection provided to the cylinder 106. The controller 180 may also send control signals to the throttle 116 to vary engine speed. The other adjustable components receiving commands from the controller may also function in a similar manner.

Therefore, the controller 180 receives signals from the various sensors and employs the various actuators to adjust engine operation based on the received signals and instructions stored in memory (e.g., non-transitory memory) of the controller. Thus, it will be appreciated that the controller 180 may send and receive signals from the evaporative emission control system 148. For example, adjusting the fuel tank isolation valve 150 may include commanding device actuators to adjust components in the fuel tank isolation valve to trigger opening and closing of the valve, as discussed above.

In yet another example, the amount of component, device, actuator, etc., adjustment may be empirically determined and stored in predetermined lookup tables and/or functions. For example, one table may correspond to conditions related to canister purge valve position and another table may correspond to conditions related to fuel tank isolation valve position. Moreover, it will be appreciated that the controller 180 may be configured to implement the methods, control strategies, etc., described herein.

In one example, the controller 180 may include instructions stored in the memory executable by the processor to monitor a pressure in the fuel tank as well as monitor an ambient temperature. Monitoring the pressure and temperature may include receiving signals from pressure and temperature sensors and interpreting said signals, in one example. The controller 180 may also include instructions for determining if the pressure in the fuel tank is expected to surpass a threshold pressure using the monitored fuel tank pressure and the ambient temperature. The threshold pressure may be a blow-off threshold that triggers venting of fuel vapor from the fuel tank 142 into the evaporative emission control system 148. In one example, the prediction related to the blow-off threshold may be initiated when the in-tank fuel pressure reaches a triggering pressure which is less than the blow-off threshold. The blow-off threshold is a threshold that triggers a fuel vapor venting event from the fuel tank into an evaporative emission control system. Furthermore, the blow-off threshold may be determined based on the fuel tank's shape, size, material construction, etc. The blow-off threshold may be a pressure in a range between 27 kPa and 32 kPa, in one example. However, numerous suitable blow-off thresholds have been contemplated.

In one specific example, the blow-off prediction may include generating a pressure curve using in-tank pressure sensor readings and ambient temperature sensor readings. Subsequently, a rate of change (e.g., slope) of the pressure curve may be calculated. In turn, the rate of change of the pressure curve may be used to predict if and/or when the in-tank pressure will reach a blow-off threshold.

When the controller determines that the in-tank pressure is expected to reach the blow-off threshold in a predetermined amount of time an engine start-up event is scheduled along with a fuel tank vapor purge event by the controller. Thus, the engine start-up event and the fuel vapor purge event may be subsequently initiated at the scheduled times. In this way, unwanted fuel vapor canister loading may be avoided which may reduce evaporative emissions. For instance, if the fuel tank reaches a blow-off limit and is vented and the fuel vapor canister is full the fuel vapors may be vented to the surrounding atmosphere. Moreover, the reliability of the fuel tank vapor purge strategy is improved when compared to other systems that do not predict when the fuel tank will reach an over-pressure condition and do not schedule engine start up to prevent the over-pressure condition for occurring. It will be appreciated that the fuel tank vapor purge event may be scheduled independent of an amount of fuel vapor stored in a fuel vapor canister coupled to the fuel tank. In this way, the engine may be forced to run to facilitate fuel tank vapor purge during a condition where engine operation is not needed, such as when the electric motor is in operation. For instance, the engine start-up event may be scheduled responsive to the prediction that the fuel tank will reach the blow-off threshold when the electric motor is running (e.g., providing motive power to the vehicle) and the energy storage device has stored energy that is greater than a threshold value. In another example, the engine start-up event may be scheduled responsive to the blow-off threshold prediction when the electric motor is in operation (e.g., providing motive power to the vehicle), the engine speed is less than a threshold value, and the energy storage device has a desired amount of energy stored therein. Furthermore, the engine may be shut down after the fuel tank pressure falls below a second threshold pressure. The second threshold pressure may be a pressure in a range between 7 kPa and 15 kPa, in one example. However, a variety of threshold pressures may be used. In this way, the engine may be operated in tandem with in-tank fuel vapor purging only for a duration that is needed to reach a safe pressure level in the fuel tank, if desired. Thus, the in-tank fuel vapor purging operation may be efficiently implemented.

Referring to FIG. 2, the figure schematically depicts a vehicle 201 with a hybrid propulsion system 200. Hybrid propulsion system 200 includes an internal combustion engine 202. It will be appreciated that the hybrid propulsion system 200 may be included in the vehicle 100 shown in FIG. 1. Thus, the vehicle 201 and the engine 202 shown in FIG. 2 may include at least a portion of the features, components, systems, etc., of the vehicle 100 and engine 102 described above with regard to FIG. 1 or vice versa.

The engine 202 is coupled to a transmission 204. The transmission 204 may be a manual transmission, automatic transmission, or combinations thereof. Further, various additional components may be included, such as a torque converter, and/or other gears such as a final drive unit, etc. The transmission 204 is shown coupled to a drive wheel 206, which in turn is in contact with a road surface 208.

In this example embodiment, the hybrid propulsion system 200 also includes an energy conversion device 210, which may include a motor, a generator, among others and combinations thereof. The energy conversion device 210 is further shown coupled to an energy storage device 212, which may include a battery, a capacitor, a flywheel, a pressure vessel, etc. The energy conversion device can be operated to absorb energy from vehicle motion and/or the engine and convert the absorbed energy to an energy form suitable for storage by the energy storage device (i.e. provide a generator operation). The energy conversion device can also be operated to supply an output (power, work, torque, speed, etc.,) to the drive wheel 206 and/or engine 202 (i.e., provide a motor operation). It should be appreciated that the energy conversion device may, in some embodiments, include only a motor, only a generator, or both a motor and generator, among various other components used for providing the appropriate conversion of energy between the energy storage device and the vehicle drive wheel and/or engine.

The depicted connections between engine 202, energy conversion device 210, transmission 204, and drive wheel 206 indicate transmission of mechanical energy from one component to another, whereas the connections between the energy conversion device and the energy storage device may indicate transmission of a variety of energy forms such as electrical, mechanical, etc. For example, torque may be transmitted from engine 202 to drive the vehicle drive wheel 206 via transmission 204. As described above energy storage device 212 may be configured to operate in a generator mode and/or a motor mode. In a generator mode, the hybrid propulsion system 200 absorbs some or all of the output from engine 202 and/or transmission 204, which reduces the amount of drive output delivered to the drive wheel 206, or the amount of braking torque to the drive wheel 206. Such operation may be employed, for example, to achieve efficiency gains through regenerative braking, improved engine efficiency, etc. Further, the output received by the energy conversion device may be used to charge energy storage device 212. In the motor mode, the energy conversion device may supply mechanical output to engine 202 and/or transmission 204, for example by using electrical energy stored in an electric battery.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 2 may be controlled by a vehicle controller such as the controller 180, shown in FIG. 1.

From the above, it should be understood that the exemplary hybrid propulsion system 200 is capable of various modes of operation. In a full hybrid implementation, for example, the propulsion system may operate using energy conversion device 210 (e.g., an electric motor) as the only torque source propelling the vehicle. This "electric only" mode of operation may be employed during braking, low speeds, while stopped at traffic lights, etc., in one example. However, in other examples the "electric only" mode may be implemented over a wider range of operating conditions such as at higher speeds. In another mode, engine 202 is turned on, and acts as the only torque source powering drive wheel 206. In still another mode, which may be referred to as an "assist" mode, energy conversion device 210 may supplement and act in cooperation with the torque provided by engine 202. As indicated above, energy conversion device 210 may also operate in a generator mode, in which torque is absorbed from engine 202 and/or transmission 204. Furthermore, energy conversion device 210 may act to augment or absorb torque during transitions of engine 202 between different combustion modes (e.g., during transitions between a spark ignition mode and a compression ignition mode). Additionally, an external energy source 214 may provide power to the energy storage device 212. The external energy source 214 may be a charging station outlet or other suitable power outlet, a solar panel, a portable energy storage device, etc., for instance.

FIG. 3 shows a method 300 for operating a vehicle with an internal combustion engine which reduces evaporative emissions. For instance, the method 300 as well as the other methods described herein may be implemented via the vehicle, engine, systems, and components described above with regard to FIGS. 1 and 2. However, in other examples the method 300 and/or the other methods described herein may be implemented by other suitable vehicles, engines, systems, components, etc.

At 302 the method includes determining operating conditions. The operating conditions may include in-tank fuel pressure, ambient temperature, engine speed, engine load, manifold air pressure, throttle position, exhaust gas composition, exhaust gas temperature, engine temperature, etc. It will be appreciated that a pressure curve may be generated based on the in-tank pressure and the ambient temperature. Furthermore, the operating conditions may be determined from signals sent from sensors in the engine and/or vehicle. Additionally or alternatively, certain operating conditions may be inferred from other operating parameters, in some examples.

Next at 304 the method includes determining if an in-tank fuel pressure is expected to surpass a first threshold pressure based on a rate of change of fuel tank pressure inferred from the in-tank fuel pressure and the ambient temperature. The first threshold pressure may be a blow-off threshold that triggers venting of fuel vapor from the fuel tank, as previously discussed. The first threshold pressure may be a pressure in a range between 27 kPa and 32 kPa, for example. However, a number of different pressure thresholds have been contemplated. The fuel tank pressure prediction may also be carried out independent of fuel vapor canister loading. For instance, a different method may be implemented when the vapor canister is overloaded, such as the method described herein with regard to FIG. 5.

If it is determined that the in-tank fuel pressure is not expected to surpass the first threshold pressure (NO at 304) the method moves to step 305. At step 305 the method includes maintaining current engine operating parameters. After step 305 the method returns to step 302. However, if it is determined that the in-tank fuel pressure is expected to surpass the first threshold pressure (YES at 304) the method advances to 306.

At 306 the method includes regulating fuel tank pressure to reduce fuel tank venting emissions. Regulating the fuel tank pressure may include steps 308-314. At 308 the method includes scheduling an engine start-up event, where the start-up event is scheduled prior to the time at which the fuel tank pressure is expected to surpass the first threshold pressure. Scheduling an engine start-up event may include initiating combustion in the engine cylinder's via scheduling fuel injection and cylinder ignition for the cylinders. In this way, the engine may be operated to generate a vacuum in the intake system to facilitate vapor purge operation.

At 310 the method includes scheduling a fuel tank vapor purge event. It will be appreciated that the fuel tank vapor purge event may be coordinated with the engine start-up event. For instance, the fuel tank vapor purge event may be scheduled at a time interval after the start-up is scheduled to occur.

At 312 the method includes initiating the engine start-up event at the schedule time. Next at 314 the method includes initiating the fuel tank vapor purge event subsequent to initiation of the engine start-up event at the schedule time. Initiating the fuel tank vapor purge event may include opening the fuel tank isolation valve, the canister purge valve, and a valve in the ELCM. Initiating the fuel tank vapor purge event may also include operating a pump in the ELCM. In this way, a vacuum may be generated in the intake system of the engine and then the fuel vapor from the fuel tank may be purged to prevent an over-pressure condition in the tank. Consequently, the likelihood of fuel tank degradation from an overpressure condition is reduced while also reducing evaporative emissions.

At 316 the method includes determining if the fuel tank pressure is below a second threshold pressure. The second threshold pressure may correspond to a safe pressure level in the fuel tank that is less than the first threshold pressure. For instance, the second threshold pressure may be a pressure in a range between 7 kPa and 15 kPa, in one example. However, a variety of threshold pressures have been contemplated. In this way, purging operation may be discontinued and the engine may be shut down when the fuel tank reaches a safe pressure level where over-pressure fuel tank degradation is not likely to occur.

If it is determined that the fuel tank pressure is not below the second threshold pressure (NO at 316) the method moves to 318. At 318 the method includes maintaining engine operation and fuel tank purge operation. In this way, the engine and vapor purge operation may be sustained when it is determined that the fuel tank pressure is not below the second threshold.

On the other hand, if it is determined that the fuel tank pressure is below the second threshold pressure (YES at 316) the method advances to 320. At 320 the method includes discontinuing fuel tank vapor purge operation. For instance, the canister purge valve may be closed and/or the ELCM may be shut-down. Next at 322 the method includes shutting down the engine. It will be appreciated that in the case of a hybrid vehicle, the electric motor may be operated after the engine is shut down. Specifically in one example, the electric motor may stopped when the engine is started at step 312 and started up when the engine is shutdown at step 322. However, in other examples, the electric motor may be operated while steps 302-322 are implemented. Still further in other example, the electric motor may not be operated during steps 302-322 such as when the hybrid vehicle is briefly stopped such as in traffic, at a stop light, etc.

Turning to FIG. 4 which depicts a method 400 for operating a vehicle with an internal combustion engine and electric motor that reduces evaporative emissions. At 402 the method includes determining operating conditions that may include steps 404-406. At 404 the method includes determining fuel tank pressure and at 406 the method includes determining ambient temperature. Additionally, other operating conditions may be determined such as engine speed, engine load, manifold air pressure, throttle position, etc.

At 408 the method includes determining the in-tank pressure sensor is functioning as desired. Determining if the in-tank pressure sensor is functioning as desired may include determining if a signal is being received from the in-tank pressure sensor and the pressure sensor signal is within an expected range.

If it is determined that the in-tank pressure sensor is not functioning as desired (NO at 408) the method ends. However, if it is determined that the in-tank pressure sensor is functioning as desired (YES at 408) the method advances to 410.

At 410 the method includes determining if the engine is shutdown. If the engine is not shutdown (NO at 410) the method moves to 412. At 412 the method includes maintaining engine operation. After 412 the method returns to 402. However, in other examples the method may end after step 412.

On the other hand, if it is determined that the engine is shutdown (YES at 410) the method advances to 414. At 414 the method includes determining if the fuel tank pressure is expected to surpass a first threshold pressure. The first threshold pressure may be a pressure in a range between 27 kPa and 32 kPa. The first pressure threshold pressure may correspond to a pressure that triggers a fuel vapor venting event from the fuel tank into the evaporative emission control system. In some examples, the fuel vapor may be vented into the surrounding environment. It will be appreciated that the first threshold pressure may be set to trigger such venting to avoid fuel tank degradation. Moreover, the prediction of fuel tank pressure exceeding the first threshold pressure may be determined based on the techniques described above with regard to FIG. 3, such as ascertaining a rate of change of the pressure and extrapolating the predicted pressure from the rate of change of the pressure.

If it is determined that the fuel tank pressure is not expected to surpass the first threshold pressure (NO at 414) the method moves to 416 where the method includes maintaining engine shutdown. It will be appreciated, that maintaining engine shutdown may include preventing combustion operation in cylinders in the engine. On the other hand, if it is determined that the fuel tank pressure is expected to surpass the threshold value (YES at 414) the method moves to 418. At 418 the method includes scheduling a start-up event and at 420 the method includes scheduling the fuel tank vapor purge event. The start-up event and the fuel tank purge event may be scheduled prior to the time the fuel tank pressure is expected to surpass the first threshold value. Furthermore, it will be appreciated that the fuel tank purge event may be scheduled after the engine is scheduled to start. In this way, a predictive technique may be used to trigger fuel tank vapor purge to reduce evaporative emissions.

At 422 the method includes initiating the engine start-up event at the scheduled time. Next at 424 the method includes initiating the fuel tank vapor purge event at the scheduled time. Initiating the fuel tank vapor purge event may include opening the fuel tank isolation valve, the canister purge valve, and a valve in the ELCM. Initiating the fuel tank vapor purge event may also include operating a pump in the ELCM. In this way, the pressure in the fuel tank can be reduced while avoiding an increase in evaporative emissions.

At 426 the method includes determining if the fuel tank pressure is below a second threshold pressure. The second threshold pressure may be a pressure in a range between 7 kPa and 15 kPa, in one example. If the fuel tank pressure is not below the second threshold pressure (NO at 426) the method moves to 428 where the method includes maintaining engine operation and fuel tank vapor purge operation. On the other hand, if the fuel tank pressure is below the second threshold pressure (YES at 426) the method proceeds to 430. At 430 the method includes discontinuing fuel tank vapor purge operation and initiating engine shutdown. As discussed above with regard to FIG. 3, the electric motor in the vehicle may be operated during steps 402-430. In some cases, the electric motor may be shutdown at step 422 and restarted at step 430. In this way, engine operation and electric motor operation may be coordinated to increase vehicle efficiency.

FIG. 5 shows a method 500 for purging a fuel vapor canister based on canister loading. It will be appreciated that the method 500 may be implemented independent of the predictive fuel tank vapor venting methods implemented in FIGS. 3 and 4. At 502 the method includes determining operating conditions. The operating conditions may include fuel vapor canister load, engine speed, engine load, manifold air pressure, throttle position, manifold airflow, etc.

At 504 the method includes determining if the engine is running. If it is determined that the engine is not running (NO at 504) the method ends. Conversely, if it is determined that the engine is running (YES at 504) the method moves to 506. At 506 the method includes determining if fuel vapor canister purging is desired. Such a determination may be based on vapor levels in the canister. If it is determined that fuel vapor canister purge operation is not desired (NO at 506) the method returns to 502. Conversely, if it is determined that fuel vapor canister purge operation is desired the method moves to 508 where the method includes opening the canister purge valve. Next at 510 the method includes opening the ELCM valve. Additionally, the ELCM pump may also be turned on at step 510, in one example. Method 500 enables a separate purging strategy to be implemented when the fuel vapor canister is full that is independent of fuel tank vapor purge operation.

FIG. 6 shows a method 600 for starting an engine. It will be appreciated that the method 600 may be implemented independent of the predictive fuel tank vapor venting methods implemented in FIGS. 3 and 4. Specifically in some examples, the engine start-up initiated in method 600 may override the engine start-up and shut-down control strategies in methods 300 and 400. Furthermore, it will be appreciated that method 600 may only be implemented while the engine is shut down. Additionally, the method 600 may be implemented during operation of an electric motor in the vehicle.

At 602 the method includes determining operating conditions. The operating conditions may include fuel vapor canister load, engine speed, engine load, manifold air pressure, throttle position, manifold airflow, energy storage device state of charge, duration between refueling events, refueling events magnitude, etc.

Next at 604 the method includes determining if an engine start-up threshold has been reached. An engine start-up threshold may include a condition where the fuel vapor canister loading has surpassed a threshold value. For instance, the fuel vapor canister loading may approach an upper limit and the engine may therefore be automatically started to facilitate canister purging operation. In another example, the start-up threshold may include a condition where the fuel tank pressure surpasses a threshold pressure such as the first threshold pressure discussed with regard to FIGS. 3 and 4. In this way, over pressure conditions in the fuel tank can be mitigated. In yet another example, a fuel age (e.g., duration between fuel tank refueling events) may be used as a start-up threshold to prevent fuel from degrading in the fuel tank due to fuel stagnation. In yet another example, an amount of energy stored in an energy storage device may be used as a start-up threshold. For instance, if the amount of energy stored in a battery powering the electric motor falls below a threshold value the engine may be started to generate motive power. In another example, it may be determined if a threshold number of refueling events has been reached and responsive (e.g., in direct response) to such a determination the engine may be started.

If it is determined that the engine start-up condition has not been reached (NO at 604) the method returns to 602. On the other hand, if it is determined that the engine start-up condition has been reached (YES at 604) the method advances to 606. At 606 the method includes initiating engine-start up. When the start-up is initiated in response to the vapor canister loading reaching a threshold value a vapor purging strategy may also be implemented where fuel vapor is flowed from the vapor canister into the intake system. For instance, the canister purge valve may be opened and ELCM may be operated to induce or increase airflow through the fuel vapor canister.

Now turning to FIG. 7, example map 700 graphically depicts ambient temperature, fuel tank pressure, engine operation conditions, and electric motor operation conditions during a fuel tank vapor purge method, such as the methods shown in FIGS. 4 and 5. Moreover, the map 700 may correspond to the vehicle, engine, and components described above with regard to FIGS. 1 and 2. The example of FIG. 7 is drawn substantially to scale, even though each and every point is not labeled with numerical values. As such, relative differences in timings can be estimated by the drawing dimensions. However, other relative timings may be used, if desired. A pressure curve is indicated at 702 and an ambient temperature curve is indicated at 704. It will be appreciated that the ambient temperature has an effect on the fuel tank pressure and thus the pressure curve may be adjusted based on the ambient temperature. Specifically, pressure curve predictions may be adjusted based on the ambient temperature. An internal combustion operation condition is indicated at 706. The condition includes an "ON" condition and an "OFF" condition. The "ON" conditions indicates that the engine is performing combustion cycles and the "OFF" condition indicates the engine is shut down and not performing combustion. A control signal for the canister purge valve is indicated at 708 and a control signal for the fuel tank isolation valve indicated at 710. The control signals for both the canister purge valve and the fuel tank isolation valve have an "OPEN" and "CLOSED" value. The "OPEN" condition corresponds to a valve configuration where fuel vapor can flow therethrough and a "CLOSED" condition corresponds to a valve configuration that inhibits fuel vapor from flowing through the valve. It will be appreciated that the valves may have a number of different open positions corresponding to different degrees of opening of the valves. An ELCM signal is indicated at 712. The ELCM signal may correspond to a control signal sent to the ELCM to turn on or off the ELCM. Turning on the ELCM may include opening an ELCM valve and/or operating an ELCM pump. On the other hand, turning off the ELCM may include closing the ELCM valve and/or discontinuing operation of the ELCM pump. In another example, turning on and off the ELCM may include only opening an ELCM valve or only operating an ELCM pump. An electric motor condition is indicated at 714. The "ON" condition indicates when the electric motor is operating to provide motive power to a drive wheel and the "OFF" condition indicates that the electric motor is not in operation. As shown, the electric motor remains on for the duration of fuel tank vapor purge method. However, other electric motor control strategies have been contemplated, such as turning the electric motor off at t2 and turning the electric motor on at t5. In another example, the electric motor output may be decreased at t2 and/or at t5.

When the pressure curve surpasses a trigger threshold 716 a slope 717 of the pressure curve is calculated. In the illustrated example, the rise and run of the pressure curve is calculated. In other examples, an instantaneous pressure curve slope may be calculated. The slope of the pressure curve may be extrapolated to determine when the pressure in the fuel tank is expected to surpass a blow-off threshold 718 at time t4. As discussed above, the blow-off threshold 718 may correspond to a threshold when fuel tank vapor venting is needed to avoid fuel tank pressure degradation.

In response to the prediction that the fuel tank pressure will reach the blow-off threshold 718 an engine start-up event is scheduled at time t2 and a fuel tank vapor purge event is scheduled at time t3. The fuel tank vapor purge event includes opening the fuel tank isolation valve and the canister purge valve as well as turning on the ELCM to facilitate fuel vapor flow from the fuel tank to the intake system. In this way, an overpressure condition in the fuel tank may be predicted and mitigating actions may be taken to avoid the overpressure condition while also avoiding an increase in evaporative emissions.

At time t5 the fuel tank pressure falls below a second threshold pressure 720. The second threshold pressure is a fuel tank pressure that is below the blow-off threshold by a desired amount such that the likelihood of an overpressure condition occurring again within a short time interval is reduced. For instance, the second threshold pressure may be ambient pressure. In this way, vapor from the fuel tank may be purged until the fuel tank reaches a desired pressure.

The technical effect of scheduling an engine start-up event responsive to predicting that the fuel tank will reach a blow-off limit is the avoidance of uncontrolled fuel vapor canister loading, a reduction in evaporative emissions, more rapid tank depressurization time during hot weather conditions, the maintenance of the fuel tank within a desired pressure ranges, and/or an increase in the reliability of the fuel of the fuel tank vapor venting strategy.

The invention will be further described in the following paragraphs. In one aspect, a method for operating a vehicle with an internal combustion engine is provide that includes regulating a pressure in a fuel tank by scheduling a first engine start-up event based on a rate of change of the fuel tank pressure to reduce fuel tank venting emissions, where the rate of change of the fuel tank pressure is determined based on an ambient temperature and an in-tank pressure. The method may further include scheduling a fuel tank purge event subsequent to the engine start-up event to purge fuel vapor from the fuel tank via an evaporative emission control system. The method may further include subsequent to the engine start-up event, initiating an engine shutdown event when the pressure in the fuel tank falls below a second threshold pressure. The method may also further include operating an electric motor in the vehicle to provide motive power to a drive wheel during regulation of the pressure in the fuel tank. The method may also further include initiating a second engine start-up in direct response to determining that vapor storage in a fuel vapor canister in the emission control system has surpassed a threshold value. In yet another example, the method may further include initiating a second engine start-up in direct response to determining that the fuel tank has reached a second threshold pressure.

In another aspect, a vehicle system is provided that includes an internal combustion engine coupled to the drive wheel, a fuel delivery system supplying fuel to the internal combustion engine and including a fuel tank, and a controller including instructions stored in memory executable by a processor to, monitor a pressure in the fuel tank and an ambient temperature, determine if the pressure in the fuel tank is expected to surpass a first threshold pressure based on the fuel tank pressure and the ambient temperature, where the first threshold pressure triggers a fuel vapor venting event from the fuel tank, and if it is determined that the fuel tank pressure is expected to surpass the first threshold pressure, schedule an engine start-up event in the internal combustion engine.

In another aspect, a method for operating a vehicle including an electric motor and an internal combustion engine is provided that includes operating the electric motor while the internal combustion engine is shutdown, monitoring a pressure in a fuel tank in a fuel delivery system delivering fuel to the internal combustion engine and an ambient temperature, determining if the fuel tank is expected to surpass a first threshold pressure that triggers a fuel tank venting event in an evaporative emission control system based on the pressure in the fuel tank and the ambient temperature, and when it is determined that the pressure in the fuel tank is expected to surpass the first threshold pressure, scheduling a first engine start-up event in the internal combustion engine and scheduling a fuel tank purge event in an evaporative emission control system subsequent to the start-up event. The method may further include initiating the start-up event at a scheduled time, and subsequent to initiating the first engine start-up event and when the fuel tank pressure decreases below a second threshold pressure, shutting down the internal combustion engine while maintaining operation of the electric motor. The method may also include initiating a second engine start-up event in response to determining that a number of refueling events for the fuel tank has surpassed a threshold value.

In any of the aspects or combinations of the aspects, the fuel tank purge event may be scheduled to occur prior to a predicted time at which fuel tank vapor venting to an evaporative emission control system is expected to occur.

In any of the aspects or combinations of the aspects, scheduling a first engine start-up event based on the rate of change of the fuel tank pressure may include determining if the pressure in the fuel tank is expected to surpass a first threshold pressure within a predetermined time interval based on the rate of change of fuel tank pressure.

In any of the aspects or combinations of the aspects, the fuel tank pressure regulation may be implemented independent of an amount of fuel vapor stored in a fuel vapor canister coupled to the fuel tank.

In any of the aspects or combinations of the aspects, the vehicle system may further include an electric motor coupled a drive wheel, instructions stored in memory executable by the processor to prior to monitoring the fuel tank pressure, operate the electric motor to provide motive power to the drive wheel while the internal combustion engine is shutdown.

In any of the aspects or combinations of the aspects, the vehicle system may further include instructions stored in memory executable by the processor to initiate the start-up event at a scheduled time, and subsequent to initiating the start-up event in the internal combustion engine and when the fuel tank pressure decreases below a second threshold pressure, shutdown the internal combustion engine while maintaining operation of the electric motor.

In any of the aspects or combinations of the aspects, where determining if the fuel tank pressure is expected to surpass the first threshold pressure may include determining when a rate of change in the fuel tank pressure indicates that the fuel tank pressure is projected to surpass the threshold value within a predetermined time interval.

In any of the aspects or combinations of the aspects, the vehicle system may further include instructions stored in memory executable by the processor to schedule a fuel tank vapor purge event in an evaporative emission control system subsequent to the first scheduled engine start-up event.

In any of the aspects or combinations of the aspects, the fuel tank vapor purge event may be scheduled independent of an amount of fuel vapor stored in a fuel vapor canister coupled to the fuel tank.

In any of the aspects or combinations of the aspects, where determining if the fuel tank is expected to surpass the first threshold pressure may be based on a rate of change of the pressure in the fuel tank.

In any of the aspects or combinations of the aspects, the method may further include initiating the start-up event at a scheduled time, and subsequent to initiating the start-up event and when the fuel tank pressure decreases below a second threshold pressure, shutting down the internal combustion engine while maintaining operation of the electric motor.

In any of the aspects or combinations of the aspects, the electric motor may remain in operation when the internal combustion engine is shutdown.

In any of the aspects or combinations of the aspects, the fuel tank purge event may be scheduled independent of an amount of fuel vapor stored in a fuel vapor canister coupled to the fuel tank.

In any of the aspects or combinations of the aspects, the vehicle system may further include instructions stored in memory executable by the processor to trigger a second engine start-up in direct response to determining that vapor storage in a fuel vapor canister in the emission control system has surpassed a threshold value or determining that the fuel tank has reached a second threshold pressure.

Note that the example control and estimation routines included herein can be used with various engine, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other types of engines (V-6, I-4, I-6, V-12, opposed 4, etc.,), vehicle systems, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. A method for operating a vehicle with an internal combustion engine, comprising:
   predicting an over-pressure condition in a fuel tank using a rate of change of a pressure in the fuel tank, the prediction of over-pressure condition including predicting a time at which venting of the fuel tank will occur; and
   regulating the pressure in the fuel tank by scheduling a first engine startup event based on the predicted over-pressure condition to reduce fuel tank venting emissions;
   where the rate of change of the fuel tank pressure is determined based on an ambient temperature and an in-tank pressure; scheduling a fuel tank purge event subsequent to the first engine start-up event to purge fuel vapor from the fuel tank via an evaporative emission control system, where the fuel tank purge event is scheduled to occur prior to the predicted time at which fuel tank vapor venting to the evaporative emission control system is expected to occur.

2. The method of claim 1, where scheduling the first engine start-up event based on the predicted over-pressure condition includes determining if the pressure in the fuel tank is expected to surpass a first threshold pressure within a predetermined time interval based on the rate of change of fuel tank pressure.

3. The method of claim 1, further comprising operating an electric motor in the vehicle to provide motive power to a drive wheel during regulation of the pressure in the fuel tank.

4. The method of claim 1, further comprising initiating a second engine start-up in direct response to determining that vapor storage in a fuel vapor canister in the emission control system has surpassed a threshold value.

5. The method of claim 1, further comprising initiating a second engine start-up in direct response to determining that the fuel tank has reached a second threshold pressure.

6. A vehicle system, comprising:
   an internal combustion engine coupled to the drive wheel;
   a fuel delivery system supplying fuel to the internal combustion engine and including a fuel tank; and
   a controller including instructions stored in memory executable by a processor to:
     monitor a pressure in the fuel tank and an ambient temperature;
     determine if the pressure in the fuel tank is expected to surpass a first threshold pressure based on the fuel tank pressure and the ambient temperature, where the first threshold pressure triggers a fuel vapor venting event from the fuel tank;
     predict a time at which the fuel tank pressure will reach the first threshold pressure; and
     if it is determined that the fuel tank pressure is expected to surpass the first threshold pressure, schedule a first engine start-up event in the internal combustion engine prior to the predicted time at which the fuel tank pressure reaches the first threshold pressure.

7. The vehicle system of claim 6, further comprising:
   an electric motor coupled a drive wheel;
   instructions stored in memory executable by the processor to:
     prior to monitoring the fuel tank pressure, operate the electric motor to provide motive power to the drive wheel while the internal combustion engine is shutdown.

8. The vehicle system of claim 7, further comprising instructions stored in memory executable by the processor to:
   initiate the start-up event at a scheduled time; and
   subsequent to initiating the start-up event in the internal combustion engine and when the fuel tank pressure decreases below a second threshold pressure, shutdown the internal combustion engine while maintaining operation of the electric motor.

9. The vehicle system of claim 6, where determining if the fuel tank pressure is expected to surpass the first threshold pressure includes determining when a rate of change in the fuel tank pressure indicates that the fuel tank pressure is projected to surpass the threshold value within a predetermined time interval.

10. The vehicle system of claim 6, further comprising instructions stored in memory executable by the processor to:
   schedule a fuel tank vapor purge event in an evaporative emission control system subsequent to the first scheduled engine start-up event.

11. The vehicle system of claim 10, where the fuel tank vapor purge event is scheduled independent of an amount of fuel vapor stored in a fuel vapor canister coupled to the fuel tank.

12. The vehicle system of claim 10, further comprising instructions stored in memory executable by the processor to:
   trigger a second engine start-up in direct response to determining that vapor storage in a fuel vapor canister in the emission control system has surpassed a threshold value or determining that the fuel tank has reached a second threshold pressure.

13. The vehicle system of claim 6, where the engine start-up event is scheduled independent of an amount of fuel vapor stored in a fuel vapor canister coupled to the fuel tank and even if the amount of stored vapor is below a lower threshold, the lower threshold lower than a higher threshold, where upon reaching the higher threshold an engine start is triggered independent of the monitored pressure.

14. A method for operating a vehicle including an electric motor and an internal combustion engine, comprising:
   operating the electric motor while the internal combustion engine is shutdown;
   monitoring a pressure in a fuel tank in a fuel delivery system delivering fuel to the internal combustion engine and an ambient temperature;
   determining if the fuel tank pressure exceeds a trigger threshold and is expected to surpass a first threshold pressure that triggers a fuel tank venting event in an evaporative emission control system based on the pressure in the fuel tank and the ambient temperature; and
   when it is determined that the pressure in the fuel tank is expected to surpass the first threshold pressure, scheduling a first engine start-up event in the internal combustion engine and scheduling a fuel tank purge event in an evaporative emission control system subsequent to the first engine start-up event, and where the first engine start-up event and the fuel tank purge event are scheduled after the trigger threshold but prior to the first threshold pressure.

15. The method of claim 14, where determining if the fuel tank is expected to surpass the first threshold pressure is based on a rate of change of the pressure in the fuel tank.

16. The method of claim 14, further comprising initiating a second engine start-up event in response to determining that a number of refueling events for the fuel tank has surpassed a threshold value.

17. The method of claim 15, where the electric motor remains in operation when the internal combustion engine is shutdown.

18. The method of claim 14, where the fuel tank purge event is scheduled independent of an amount of fuel vapor stored in a fuel vapor canister coupled to the fuel tank.

* * * * *